(12) United States Patent
Hwang et al.

(10) Patent No.: US 7,733,437 B2
(45) Date of Patent: Jun. 8, 2010

(54) DISPLAY DEVICE AND MOBILE TERMINAL HAVING THE SAME

(75) Inventors: Hyun Ha Hwang, Seoul (KR); Seung Gon Kang, Hwasung-shi (KR)

(73) Assignee: LG Innotek Co., Ltd., Seoul (KR)

( * ) Notice: Subject to any disclaimer, the term of this patent is extended or adjusted under 35 U.S.C. 154(b) by 325 days.

(21) Appl. No.: 11/997,538

(22) PCT Filed: Aug. 1, 2007

(86) PCT No.: PCT/KR2007/003706

§ 371 (c)(1),
(2), (4) Date: Jan. 31, 2008

(87) PCT Pub. No.: WO2008/020685

PCT Pub. Date: Feb. 21, 2008

(65) Prior Publication Data

US 2008/0218657 A1 Sep. 11, 2008

(30) Foreign Application Priority Data

Aug. 17, 2006 (KR) ...................... 10-2006-0077454

(51) Int. Cl.
G02F 1/1335 (2006.01)
F21V 7/04 (2006.01)

(52) U.S. Cl. ............................ 349/61; 349/62; 349/63; 362/602

(58) Field of Classification Search .................. 349/61, 349/62, 63; 362/26, 602, 611
See application file for complete search history.

(56) References Cited

U.S. PATENT DOCUMENTS

| 5,103,328 A * | 4/1992 | Numao | 349/74 |
| 2004/0183960 A1 * | 9/2004 | Kim et al. | 349/61 |

FOREIGN PATENT DOCUMENTS

| CN | 1550842 A | 12/2004 |
| EP | 1-408-673 A2 | 4/2004 |
| JP | 2003-008707 A | 1/2003 |
| JP | 2003-066445 A | 3/2003 |
| JP | 2004-287436 A | 10/2004 |
| JP | 2004-341109 A | 12/2004 |
| KR | 10-2004-0098492 A | 11/2004 |
| KR | 10-2005-0094524 A | 9/2005 |

* cited by examiner

*Primary Examiner*—Mike Qi
(74) *Attorney, Agent, or Firm*—Saliwanchik, Lloyd & Saliwanchik

(57) ABSTRACT

Provided are a display device and a mobile terminal having the same. The display device comprises a transmissive liquid crystal panel, a first backlight unit on a rear side of the transmissive liquid crystal panel, a second backlight unit on a front side of the transmissive liquid crystal panel, and an optical shutter outside at least one of the first and second backlight units.

20 Claims, 3 Drawing Sheets

[Fig. 1]
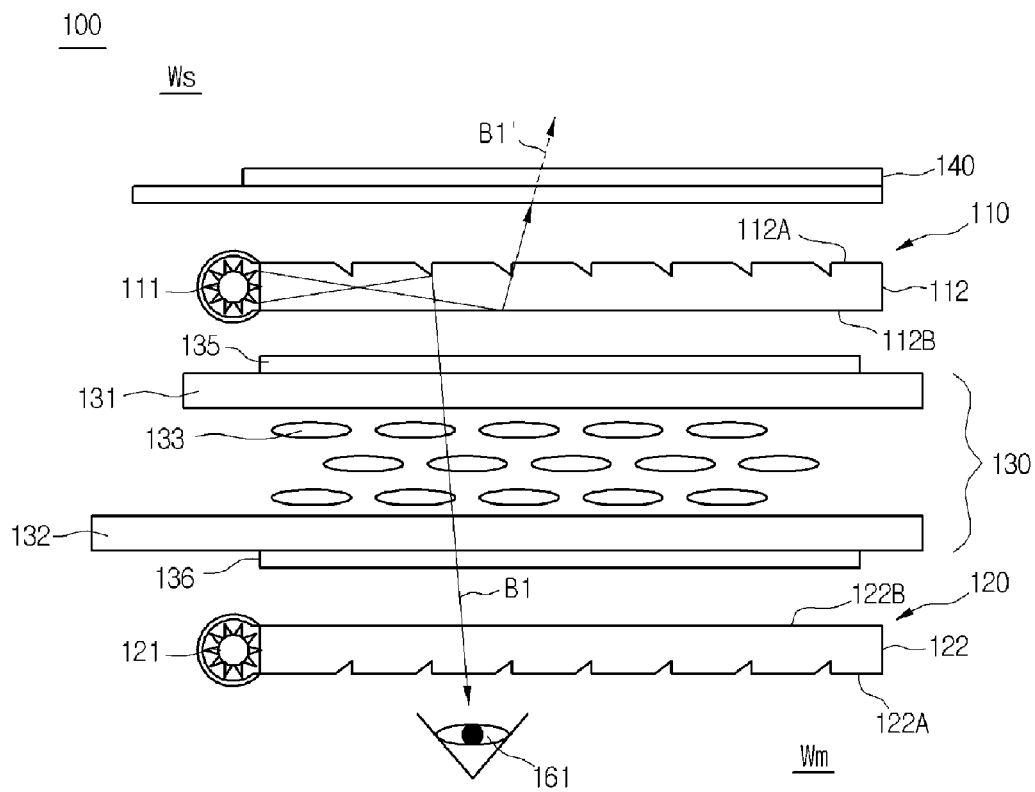
[Fig. 2]
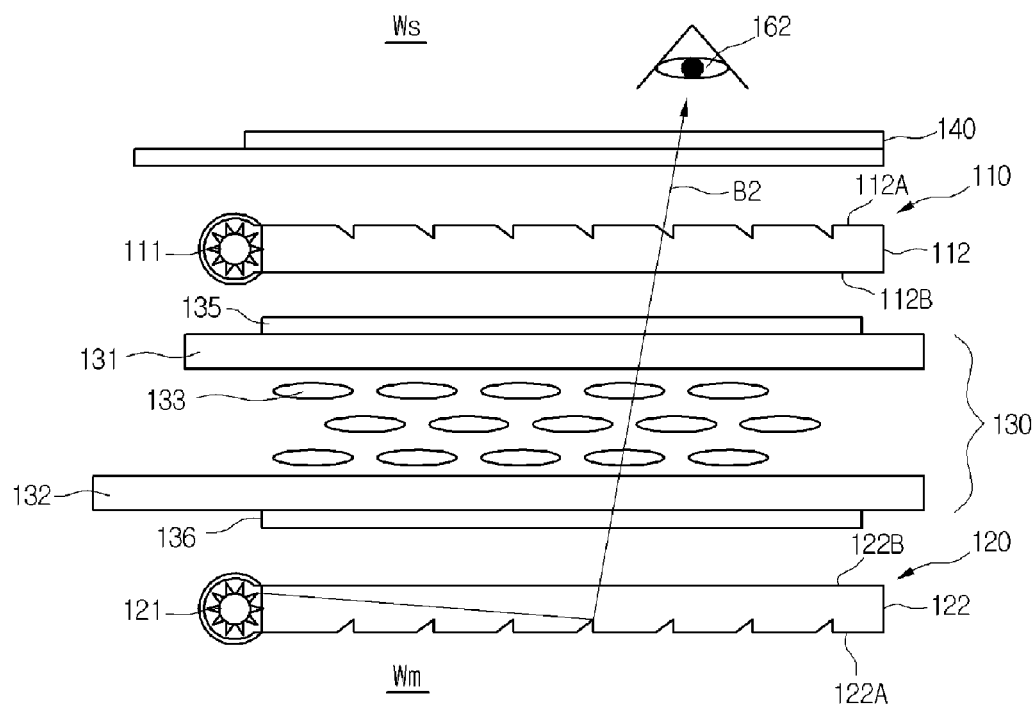

[Fig. 3]
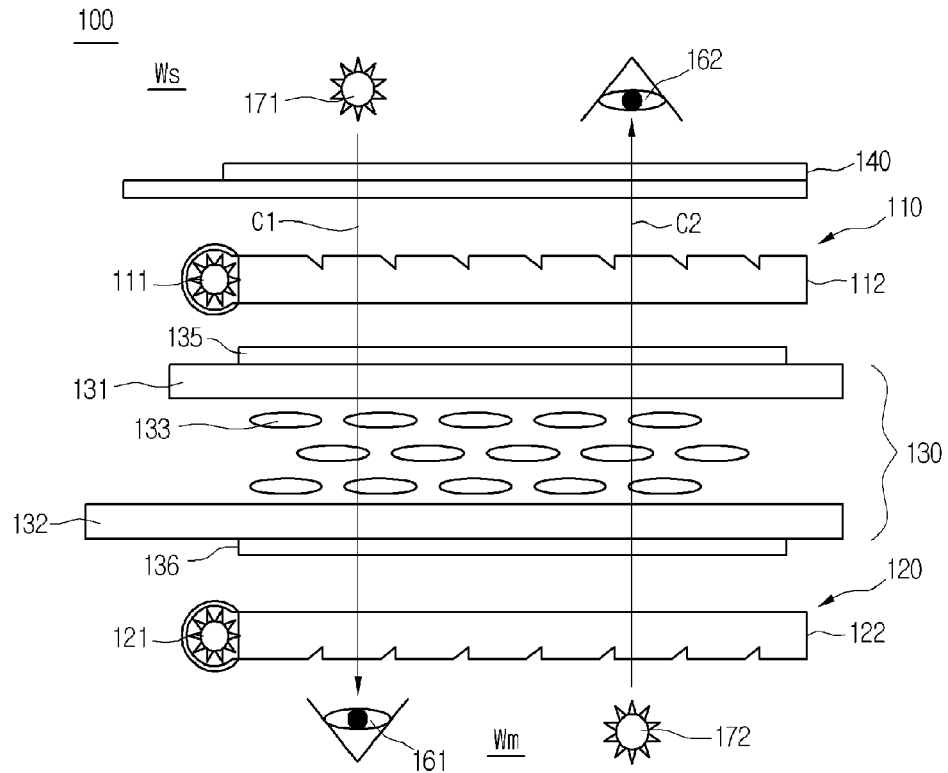
[Fig. 4]
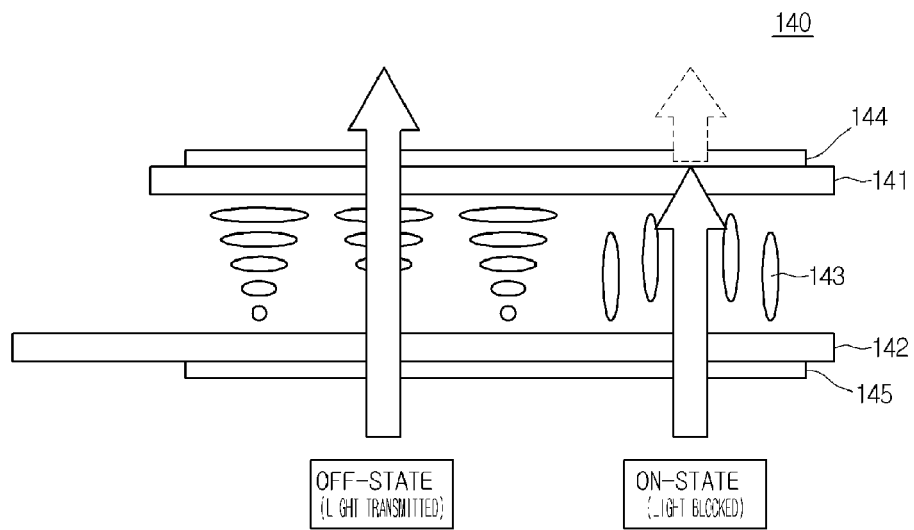

[Fig. 5]
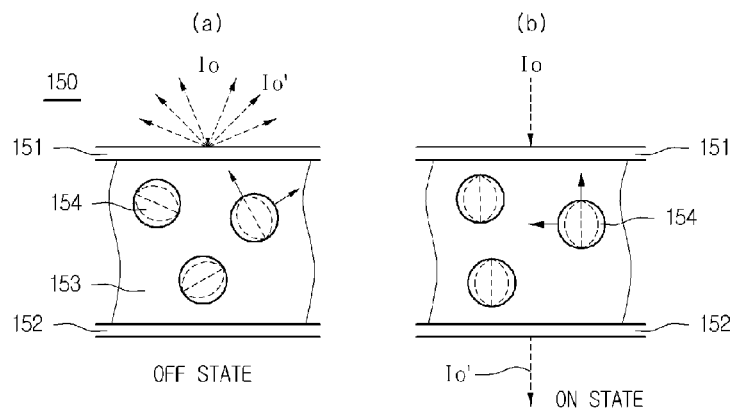
[Fig. 6]
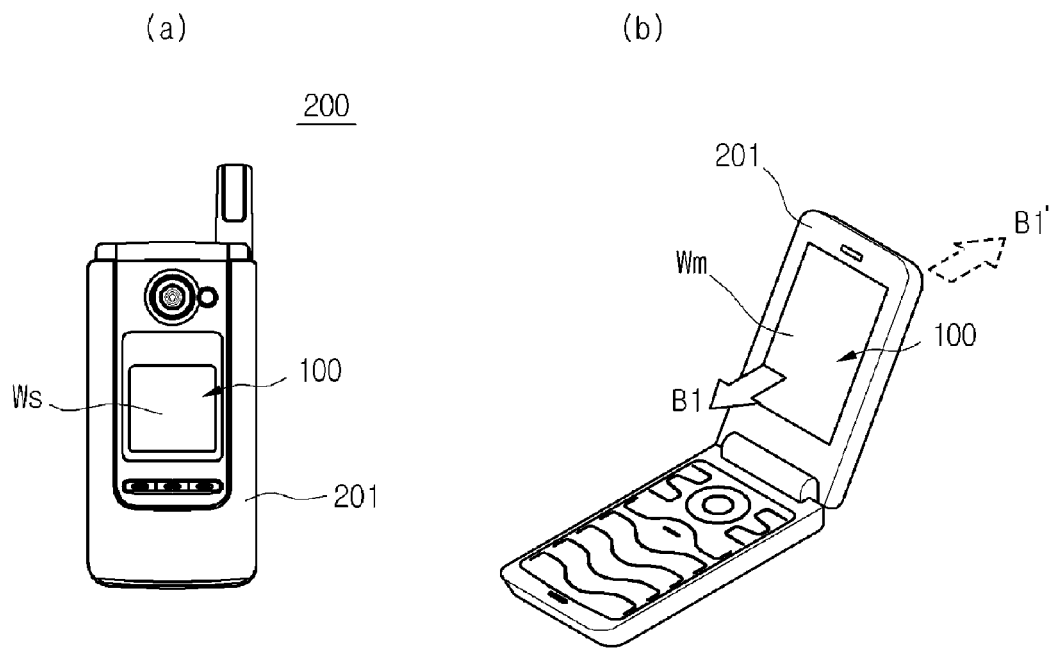

DISPLAY DEVICE AND MOBILE TERMINAL HAVING THE SAME

CROSS-REFERENCE TO RELATED APPLICATION

This application is the U.S. national stage application of International Patent Application No. PCT/KR2007/003706, filed Aug. 1, 2007, the disclosure of which is hereby incorporated by reference in its entirety.

TECHNICAL FIELD

Embodiments relate to a display device and a mobile terminal having the same.

BACKGROUND ART

Examples of display devices include cathode ray tubes (CRTs), liquid crystal display (LCD) devices using an optical effect of electric field, plasma display panels (PDPs) using gas discharge, and electro luminescence display (ELD) devices using a light emitting effect of an electric field. Among them, research on the LCD devices is in active progress.

Since the LCD devices have advantages of a small size, lightweight, low power consumption, and full colors to overcome limitations of CRTs, fields to which the LCD devices are applied gradually extend.

Since the LCD devices are light receiving devices adjusting an amount of light received from the outside to display an image, they require a separate external light source such as a light unit.

DISCLOSURE OF INVENTION

Technical Problem

Embodiments provide a display device for displaying an image in both directions, and a mobile terminal having the same.

Embodiments also provide a display device including backlight units on both sides of a transmissive liquid crystal (LC) panel so that an image is displayed on both sides of the transmissive LC panel, and a mobile terminal having the display device.

Embodiments provide a display device that can provide an optical shutter to an outside of at least one backlight unit to selectively block light leaking to the outside, and a mobile terminal having the display device.

Technical Solution

An embodiment provides a display device comprising: a transmissive liquid crystal panel; a first backlight unit on a rear side of the transmissive liquid crystal panel; a second backlight unit on a front side of the transmissive liquid crystal panel; and an optical shutter outside at least one of the first and second backlight units.

An embodiment provides a mobile terminal comprising: a transmissive liquid crystal panel; a first backlight unit on a rear side of the transmissive liquid crystal panel; a second backlight unit on a front side of the transmissive liquid crystal panel; an optical shutter outside at least one of the first and second backlight units; and a control unit for controlling driving of one of the first and second backlight units to control a display mode of the transmissive liquid crystal panel.

The details of one or more embodiments are set forth in the accompanying drawings and the description below. Other features will be apparent from the description and drawings, and from the claims.

Advantageous Effects

In a display device according to an embodiment and a mobile terminal having the same, an image can be displayed on both sides using a plurality of backlight units and a transmissive liquid crystal panel.

Also, an image can be displayed on both sides using a single transmissive liquid crystal panel, so that both screens can be made to have the same size and resolution.

Also, since an external light source can be used, power consumption can be reduced.

Also, since an optical shutter is applied to selectively block light leaking to other screen, influence of leaking light on the other screen can be prevented.

Also, in case of a camera mode, light leaking through the optical shutter can be used for a flash function or as an auxiliary light source of a camera.

BRIEF DESCRIPTION OF THE DRAWINGS

FIG. 1 is a view of a liquid crystal display (LCD) device according to an embodiment.

FIG. 2 is a view illustrating a sub-display mode using a second backlight unit in the LCD device of FIG. 1.

FIG. 3 is a view illustrating a display mode using an external light source in the LCD device of FIG. 1.

FIG. 4 is a view illustrating first embodiment of an optical shutter in the LCD device of FIG. 1.

FIG. 5 is a view illustrating second embodiment of an optical shutter in the LCD device of FIG. 1.

FIG. 6 is a view illustrating a mobile terminal having the LCD device of FIG. 1 is used.

BEST MODE FOR CARRYING OUT THE INVENTION

An LCD device according to an embodiment will be descried below with reference to the accompanying drawings.

FIG. 1 is a view of a liquid crystal display (LCD) device according to an embodiment.

Referring to FIG. 1, the LCD device 100 includes a first backlight unit 110, a second backlight unit 120, a transmissive LC panel 130, first and second polarizers 135 and 136, and an optical shutters 140.

The first backlight unit 110 is disposed on the rear side of the transmissive LC panel 130, and the second backlight unit is disposed on the front side of the transmissive LC panel 130. The first and second backlight units 110 and 120 illuminate light onto the rear side or front side of the transmissive LC panel 130.

The first backlight unit 110 includes a first light emitting part 111 and a first light guide plate 112. The second backlight unit 120 includes a second light emitting part 121 and a second light guide plate 122. The first and second light emitting parts 111 and 121 selectively use a tube typed light emitting lamp such as a light emitting diode (LED), a cold cathode fluorescence tube (CCFT), a hot cathode fluorescence tube (HCFT). The first and second light emitting parts 111 and 121 are disposed at one ends of the first and second light guide plates 112 and 122, respectively to generate light, and provide the generated light onto the first and second light guide plates 112 and 122, respectively. Here, a light source of the first light emitting part 111 can be the same as or different from a light source of the second light emitting part 121, but is not limited thereto.

The first light guide plate 112 and the second light guide plate 122 can be formed of a transparent acryl resin, a polycarbonate-based resin, an epoxy resin, or a prism.

The first light guide plate 112 includes a planarized surface 112B facing the rear side of the transmissive LC panel 130, and an uneven surface 112A corresponding to the opposite side of the planarized surface 112B. The uneven surface 112A includes successive patterns inclined in a predetermined direction with respect to the planarized surface 112B.

The second light guide plate 122 includes a planarized surface 122B facing the front side of the transflective LC panel 130, and an uneven surface 122A corresponding to the opposite side of the planarized surface 122B. The uneven surface 122A includes successive patterns inclined in a predetermined direction with respect to the planarized surface 122B. Here, the uneven surface 112A of the first light guide plate 112 can have the shapes or intervals of patterns different from those of the uneven surface 122A of the second light guide plate 122.

Light incident onto the first light guide plate 112 from the first light emitting part 111 is guided along the first light guide plate 112, reflected by the uneven surface 112A, and emitted to the planarized surface 112B. Light incident onto the second light guide plate 122 from the second light emitting part 121 is guided along the second light guide plate 122, reflected by the uneven surface 122A, and emitted to the planarized surface 122B.

The first backlight unit 110 is provided as a light source for displaying of a main screen Wm, and the second light unit 120 is provided as a light source for displaying of a sub-screen Ws.

The transmissive LC panel 130 includes a transparent first substrate 131, a transparent second substrate 132 facing each other, and an LC layer 133 interposed between the first and second substrates 131 and 132. The first substrate 131 can be realized as a color filter array substrate for example. The second substrate 132 can be realized as a thin film transistor (TFT) array substrate for example. Also, the first substrate 131 can be realized as a TFT array substrate. The second substrate 132 can be realized as a color filter array substrate. Also, the first or second substrate can be realized in a color filter on array (COA) structure where color filter array and a TFT array have been realized in an integral type. The LC layer 133 includes cells having an angle of 90° on two transparent electrodes that have been aligned such that the lengthwise axes of LC molecules are parallel to the planes of the electrodes. When nematic LCs are dropped into the LC layer 133, the lengthwise axes of the LC molecules are continuously twisted by 90° from one electrode to the other electrode. Here, though twisted nematic (TN) mode has been exemplarily described for the LC, the LC panel can be realized as an LC panel to which an electrically controlled birefringence (ECB) mode, an optically compensation bend (OCB) mode, an in plane switching (IPS) mode, or a vertical alignment (VA) mode is applied. The LC panel can operate in a normally black mode or normally white mode depending on a display realizing type.

The first polarizer 135 can be attached on the rear side of the first substrate 131, and the second polarizer 136 can be attached on the front side of the second substrate 132.

That is, the first and second polarizers 135 and 136 can be attached on both sides of the transflective LC panel 130.

The first and second polarizers 135 and 136 can include a polymer polarizing material for polarizing incident light and a tri-acetyl-cellulose (TAC) support on both sides of the polarizing material, for example. Also, an adhesive layer can be formed on the first and second polarizers 135 and 136 to attach the first and second polarizers 135 and 136 onto the first and second substrates 131 and 132, respectively. The transmission axes of the first and second polarizers 135 and 136 are formed to be perpendicular to each other.

The optical shutter 140 is disposed on the outside of the first backlight unit 110, and turned on or off in synchronization with the first backlight unit 110 to block or transmit light. The optical shutter 140 prevents a portion of light illuminated from the first backlight unit 110 from leaking to the outside.

The optical shutter 140 can be disposed on the rear side of the first backlight unit 110 and/or the front side of the second backlight unit 120. Also, the optical shutter 140 can be made to be synchronized with the operation of the backlight units 110 and 120 or driven independently.

A main display mode of the LCD device will be described below.

During a display mode of the main screen Wm, the first backlight unit 110 and the optical shutter 140 are turned on, and the second backlight unit 120 is turned off.

Light B1 generated from the first light emitting part 111 of the first backlight unit 110 is reflected by the uneven surface 112A of the first light guide plate 112 and emitted as plane light through the planarized surface 112B. The light B1 emitted through the first light guide plate 112 passes through the first polarizer 135, the transmissive LC panel 130, and the second polarizer 136 to provide the main screen Wm to a user 161.

At this point, the optical shutter 140 blocks or absorbs a portion B I' light leaking from the first light guide plate 112 to the outside. Accordingly, light leaking to the rear of the first light guide plate 112 is blocked, and thus prevented from having an influence on the main screen Wm.

FIG. 2 is a view illustrating a sub-display mode using a second backlight unit in the LCD device of FIG. 1.

Referring to FIG. 2, during a display mode of the sub-screen Ws, the second backlight unit 120 is turned on, and the first backlight unit 110 and the optical shutter 140 are turned off.

Light B2 generated from the second light emitting part 121 of the second backlight unit 120 is emitted as plane light from the second light guide plate 122, and passes through the second polarizer 136, the transmissive LC panel 130, and the first polarizer 135. Also, the light B2 that has passed through the first polarizer 135 passes through the first light guide plate 112 of the first backlight unit 110, and the optical shutter 140 to display the sub-screen Ws to a user 162.

Since the main screen and/or the sub-screen are displayed using the plurality of backlight units 110 and 120 and the transmissive LC panel 130 as described above, both sides can be made to have almost the same image quality and screen size.

FIG. 3 is a view illustrating a display mode using an external light source in the LCD device of FIG. 1.

Referring to FIG. 3, a display mode can be realized using external light sources 171 and 172. Here, the first and second backlight units 110 an 120, and the optical shutter 140 can be set to be turned off when external light is greater than predetermined intensity.

During a display mode of the main screen Wm using the external light source 171, light C1 incident onto the sub-screen Ws passes through the optical shutter 140, the first light guide plate 112 of the first backlight unit 110, the first polarizer 135, the transmissive LC panel 130, the second polarizer 136, the second light guide plate 122 of the second backlight unit 120 to display an image on the main screen Wm.

During a display mode of the sub-screen Ws using the external light source 172, light C2 incident onto the main screen Wm passes through the second light guide plate 122 of the second backlight unit 120, the second polarizer 136, the transmissive LC panel 130, the first polarizer 135, and the first light guide plate 112 of the first backlight unit 110 to display an image on the sub-screen Ws by way of the optical shutter 140.

Since the external light sources are used without an internal light source as described above, power consumption can reduce. Also, since light passes through the transmissive LC panel, image quality can improve and both sides can be simultaneously viewed in comparison with a reflective LCD device.

FIG. 4 is a view illustrating first embodiment of an optical shutter in the LCD device of FIG. 1.

Referring to FIG. 4, the optical shutter 140 can be realized in a shutter using twisted nematic LCs. The twisted nematic LC shutter 140 includes an upper substrate 141, a lower substrate 142, LCs 143, and third and fourth polarizers 144 and 145.

Twisted nematic LCs 143 are interposed between the upper substrate 141 and the lower substrate 142. Third and fourth polarizers 144 and 145 are attached on the surfaces of the upper and lower substrates 141 and 142, respectively. Here, the upper and lower substrates 141 and 142 can be formed of glass in general, but can be transparent plastic substrates advantageous in aspects of thickness and impact. The third and fourth polarizers 144 and 145 are attached such that absorption axes of the third and fourth polarizers 144 and 145 are perpendicular to each other. Also, electrodes for driving LCs are formed on the upper and lower substrates 141 and 142.

This LC shutter (optical shutter) 140 simply transmits light during an off state in which power is not applied, and blocks light during an on state in which power is applied. The LCs 143 rotate, that is, the refractive indexes of the LCs 143 change depending on a voltage applied to the LCs 143 through the upper and lower substrates 141 and 142 to block or transmit incident light.

FIG. 5 is a view illustrating second embodiment of an optical shutter in the LCD device of FIG. 1.

Referring to FIG. 5, the optical shutter can be a polymer-dispersed type LC (PDLC) shutter 150. The PDLC shutter 150 can be realized in an LC resin composite body where a resin member 153 and polymer LC drops 154 fill a space between transparent electrodes 151 and 152. The PDLC shutter 150 uses light scattering without use of a separate polarizer.

The PDLC shutter 150 includes small LC drops 154 dispersed using solid polymer bonding. In the PDLC shutter 150, small LC drops 154 are arranged in random during an off-state as illustrated in FIG. 5A and disturbed due to refraction between the LC drops 154 and the polymer to scatter incident light Io.

In the PDLC shutter 150, small drops 154 are arranged in a line during an on-state as illustrated in FIG. 5B and reduce a difference in a refractive index to transmit incident light Io.

Here, during an off-state, the PDLC shutter 150 blocks or reflects incident light to provide reflected light to the first backlight unit 110 of FIG. 1. The reflected light can increase light efficiency of the first backlight unit.

FIG. 6 is a view illustrating an example in which a mobile terminal having the LCD device according to an embodiment operates.

Referring to FIGS. 1, 2 and 6, an LCD device 100 is provided to an upper main machine 201 of the folder type mobile terminal 200.

The optical shutter 140 can be installed to the sub-screen Ws of the LCD device 100. When the upper main machine 201 of the mobile terminal 200 is closed as illustrated in FIG. 6A, the light B2 emitted from the second backlight unit 120 passes through the sub-screen Ws to display an image. When the upper main machine 201 of the mobile terminal 200 is opened as illustrated in FIG. 6B, light emitted from the first backlight unit 110 passes through the main screen Wm to display an image. At this point, the light B1' leaking to the sub-screen Ws is blocked by the optical shutter 140.

Also, in the case where a camera is provided to the mobile terminal 200, the first backlight unit 110 is turned on for a camera mode. At this point, the optical shutter 140 is turned off, so that light emitted from the first backlight unit 110 passes through the main screen, and is emitted to the sub-screen through the optical shutter 140, which serves as a flash.

Also, a control unit (not shown) can selectively control a display mode displaying the main screen, a display mode displaying the sub-screen, a display mode using an external light source, and a flash mode. The mobile terminal 200 can include wired/wireless communication function.

Although embodiments have been described with reference to a number of illustrative embodiments thereof, it should be understood that numerous other modifications and embodiments can be devised by those skilled in the art that will fall within the spirit and scope of the principles of this disclosure.

For example, various variations and modifications are possible in the component parts and/or arrangements of the subject combination arrangement within the scope of the disclosure, the drawings and the appended claims. In addition, differences associated to variations and modifications in the component parts and/or arrangements should be construed to be included in the scope of the present disclosure defined by the appended claims.

INDUSTRIAL APPLICABILITY

In a display device according to an embodiment and a mobile terminal having the same, an image can be displayed on both sides using a plurality of backlight units and a transmissive LC panel.

Also, since both screens are formed using a transmissive LC panel, a main screen and a sub-screen can be made to have the same size and both screens can be made to have the same resolution and image quality.

Also, since two backlight units are transparent, an image can be display using an external light source, and thus power consumption can reduce.

Also, since two screens are formed using a single transmissive LC panel, manufacturing costs can be reduced in comparison with the case where two LC panels are used.

Also, since an optical shutter is applied, light is prevented from having an influence on other screen, not a relevant screen.

Also, in the case where camera shooting is required, an optical shutter is controlled and used for a flash function or as an auxiliary light source of a camera.

The invention claimed is:
1. A display device comprising:
a transmissive liquid crystal panel;

a first backlight unit on a rear side of the transmissive liquid crystal panel;

a second backlight unit on a front side of the transmissive liquid crystal panel; and an optical shutter outside at least one of the first and second backlight units.

2. The display device according to claim 1, wherein the optical shutter is disposed outside the first backlight unit, and turned on or off in synchronization with driving of the first backlight unit.

3. The display device according to claim 1, wherein the optical shutter is disposed outside the second backlight unit, and turned on or off in synchronization with driving of the second backlight unit.

4. The display device according to claim 1, wherein the optical shutter is disposed outside the first backlight unit to block a portion of light from the first backlight unit that leaks to an outside, and transmit light from the second backlight unit.

5. The display device according to claim 1, wherein the optical shutter comprises one of a twisted nematic liquid crystal shutter and a polymer dispersed liquid crystal shutter.

6. The display device according to claim 1, wherein the optical shutter is disposed outside the first backlight unit to reflect or transmit incident light.

7. The display device according to claim 1, comprising polarizers on both sides of the transmissive liquid crystal panel, the polarizers having polarizing axes perpendicular to each other.

8. The display device according to claim 1, wherein each of the first and second backlight units comprises:

a light emitting part for generating light at one end; and a light guide plate for guiding light generated from the light emitting part to emit the light to the liquid crystal panel.

9. The display device according to claim 8, wherein the light guide plate comprises:

a planarized surface facing the transmissive liquid crystal panel; and an uneven surface on an opposite side of the planarized surface, the uneven surface including different uneven patterns.

10. The display device according to claim 8, wherein the light emitting part comprises at least one of a tube typed light emitting lamp and a light emitting diode.

11. The display device according to claim 1, wherein the transmissive liquid crystal panel displays an image using at least one of a first display mode using light from the first backlight unit, a second display mode using light from the second backlight unit, and a third display mode using an external light source.

12. A mobile terminal comprising:

a transmissive liquid crystal panel;

a first backlight unit on a rear side of the transmissive liquid crystal panel;

a second backlight unit on a front side of the transmissive liquid crystal panel;

an optical shutter outside at least one of the first and second backlight units; and a control unit for controlling driving of one of the first and second backlight units to control a display mode of the transmissive liquid crystal panel.

13. The mobile terminal according to claim 12, wherein the control unit selects at least one of a first display mode using light from the first backlight unit, a second display mode using light from the second backlight unit, and a third display mode using an external light source.

14. The mobile terminal according to claim 13, wherein the optical shutter is disposed outside the first backlight unit to block a portion of light from the first backlight unit that leaks to an opposite side of the transmissive liquid crystal panel during the first display mode, and transmit light from the second backlight unit during the second display mode.

15. The mobile terminal according to claim 13, wherein the optical shutter transmits a portion of light from the first backlight unit that leaks to an outside during a camera mode.

16. The mobile terminal according to claim 12, wherein the optical shutter is disposed outside one of the first backlight unit and the second backlight unit, and turned on or off in synchronization with one of the first backlight unit and the second backlight unit.

17. The mobile terminal according to claim 12, wherein the optical shutter comprises one of a twisted nematic liquid crystal shutter and a polymer dispersed liquid crystal shutter.

18. The mobile terminal according to claim 12, comprising polarizers on both sides of the transmissive liquid crystal panel, the polarizers having polarizing axes perpendicular to each other.

19. The mobile terminal according to claim 12, wherein each of the first and second backlight units comprises:

a light emitting part for generating light at one end; and a light guide plate for guiding light generated from the light emitting part to emit the light to the liquid crystal panel.

20. The mobile terminal according to claim 12, wherein screens having the same resolution are provided to both sides of the transmissive liquid crystal panel, respectively.

* * * * *

UNITED STATES PATENT AND TRADEMARK OFFICE
CERTIFICATE OF CORRECTION

PATENT NO. : 7,733,437 B2  
APPLICATION NO. : 11/997538  
DATED : June 8, 2010  
INVENTOR(S) : Hyun Ha Hwang et al.

Page 1 of 1

It is certified that error appears in the above-identified patent and that said Letters Patent is hereby corrected as shown below:

ON THE TITLE PAGE:

At item (73), Assignee, change "LG Innotek Co., Ltd., Seoul (KR)" to --LG Display Co., Ltd., Seoul (KR)--.

Signed and Sealed this  
Eleventh Day of September, 2012

David J. Kappos  
*Director of the United States Patent and Trademark Office*